US012626237B2

(12) United States Patent
Gao et al.

(10) Patent No.: US 12,626,237 B2
(45) Date of Patent: May 12, 2026

(54) SELF-CHECKOUT ANTI-THEFT VEHICLE SYSTEMS AND METHODS

(71) Applicant: Maplebear Inc., San Francisco, CA (US)

(72) Inventors: Lin Gao, Miami, FL (US); Yilin Huang, Shanghai (CN); Shiyuan Yang, Shanghai (CN); Ahmed Beshry, New York, NY (US)

(73) Assignee: Maplebear Inc., San Francisco, CA (US)

( * ) Notice: Subject to any disclaimer, the term of this patent is extended or adjusted under 35 U.S.C. 154(b) by 23 days.

(21) Appl. No.: 18/403,352

(22) Filed: Jan. 3, 2024

(65) Prior Publication Data

US 2024/0135353 A1      Apr. 25, 2024

Related U.S. Application Data

(63) Continuation of application No. 17/129,437, filed on Dec. 21, 2020, now Pat. No. 11,915,217, which is a
(Continued)

(51) Int. Cl.
*G06Q 20/18* (2012.01)
*B62B 3/14* (2006.01)
(Continued)

(52) U.S. Cl.
CPC ........... *G06Q 20/18* (2013.01); *B62B 3/1412* (2013.01); *B62B 3/1428* (2013.01);
(Continued)

(58) Field of Classification Search
CPC .... G06Q 20/18; G06Q 20/202; G06Q 20/204; G06Q 20/208; G06Q 20/401;
(Continued)

(56) References Cited

U.S. PATENT DOCUMENTS

| | | |
|---|---|---|
| 9,064,161 B1 | 6/2015 | Boman et al. |
| 10,192,087 B2 * | 1/2019 | Davis ................... G06V 10/243 |

(Continued)

OTHER PUBLICATIONS

Advancing Retail, 2015, pp. 1-4, [Online] Retrieved from the Internet <URL: https://app.advancingretail.org/solutions/automated-shopping-cart>.
(Continued)

*Primary Examiner* — A. Hunter Wilder
*Assistant Examiner* — Joseph M Mutschler
(74) *Attorney, Agent, or Firm* — Fenwick & West LLP

(57) ABSTRACT

Disclosed herein relates to a self-checkout anti-theft vehicle system, comprising: a self-checkout vehicle having a plurality of sensors and components implemented thereon, the self-checkout vehicle being used by shoppers for storing selected merchandises in a retail environment; and a centralized computing device. The centralized computing device is configured to: obtain information related to each merchandise selected and placed into the self-checkout vehicle by a shopper by exchanging data with the plurality of sensors and components via a first communication network, identify each merchandise via a second, different communication network based at least upon the information obtained from the plurality of sensors and components, and process payment information of each merchandise.

10 Claims, 5 Drawing Sheets

Related U.S. Application Data continuation of application No. 15/956,159, filed on Apr. 18, 2018, now abandoned.

(60) Provisional application No. 62/537,140, filed on Jul. 26, 2017.

(51) Int. Cl.

| | |
|---|---|
| *G06K 7/10* | (2006.01) |
| *G06K 7/14* | (2006.01) |
| *G06N 3/042* | (2023.01) |
| *G06N 5/01* | (2023.01) |
| *G06N 5/022* | (2023.01) |
| *G06Q 20/20* | (2012.01) |
| *G06Q 20/40* | (2012.01) |
| *G07G 1/00* | (2006.01) |
| *G07G 1/14* | (2006.01) |
| *G07G 3/00* | (2006.01) |

(52) U.S. Cl.
CPC ....... *G06K 7/10722* (2013.01); *G06K 7/1417* (2013.01); *G06N 3/042* (2023.01); *G06N 5/022* (2013.01); *G06Q 20/202* (2013.01); *G06Q 20/204* (2013.01); *G06Q 20/208* (2013.01); *G06Q 20/401* (2013.01); *G07G 1/0036* (2013.01); *G07G 1/0081* (2013.01); *G07G 1/009* (2013.01); *G07G 1/14* (2013.01); *G07G 3/003* (2013.01); *B62B 2203/50* (2013.01); *G06N 5/01* (2023.01)

(58) Field of Classification Search
CPC .......... G06N 3/042; G06N 3/045; G06N 3/08; G06N 5/022; G06N 3/044; G06N 5/01; B62B 3/1412; B62B 3/1428; B62B 2203/50; G06K 7/10722; G06K 7/1417; G07G 1/0036; G07G 1/0081; G07G 1/009; G07G 1/14; G07G 3/003
See application file for complete search history.

(56) References Cited

U.S. PATENT DOCUMENTS

| | | | | |
|---|---|---|---|---|
| 2013/0046644 | A1* | 2/2013 | Sano | G06Q 20/20 |
| | | | | 705/18 |
| 2014/0015683 | A1* | 1/2014 | Subramanya | H04M 1/72463 |
| | | | | 340/669 |
| 2014/0052555 | A1 | 2/2014 | MacIntosh | |
| 2015/0127496 | A1* | 5/2015 | Marathe | G06Q 10/087 |
| | | | | 705/28 |
| 2017/0255793 | A1 | 9/2017 | Caldwell | |
| 2017/0323376 | A1 | 11/2017 | Glaser et al. | |
| 2018/0025412 | A1* | 1/2018 | Chaubard | G06Q 30/0639 |
| | | | | 705/26.9 |
| 2018/0218351 | A1 | 8/2018 | Chaubard et al. | |
| 2018/0330196 | A1 | 11/2018 | Chaubard et al. | |
| 2019/0043003 | A1 | 2/2019 | Fisher et al. | |
| 2019/0057435 | A1* | 2/2019 | Chomley | B62B 3/14 |
| 2019/0102654 | A1 | 4/2019 | Trehan | |
| 2019/0220692 | A1 | 7/2019 | Wu | |
| 2019/0236363 | A1 | 8/2019 | Bacelis et al. | |
| 2019/0279017 | A1 | 9/2019 | Graham et al. | |
| 2019/0279185 | A1 | 9/2019 | Cheng | |
| 2020/0089997 | A1 | 3/2020 | Chaubard | |
| 2020/0210768 | A1 | 7/2020 | Turkelson et al. | |

OTHER PUBLICATIONS

Canadian Intellectual Property Office, Office Action, Canadian Patent Application No. 3,040,252, Nov. 28, 2023, 6 pages.

Higa, K. et al. "Robust Shelf Monitoring Using Supervised Learning for Improving On-Shelf Availability in Retail Stores," Sensors, vol. 19, No. 12, 2019, pp. 1-20.

Kim, C.Y. et al., "Personalize the Brick'n Mortar," The Korea Society of Management Information Systems, Jun. 13, 2008, pp. 1088-1095.

Liang, M. et al. "Recurrent Convolutional Neural Network for Object Recognition," Proceedings of the IEEE Conference on Computer Vision and Pattern Recognition, Jun. 7-12, 2015, pp. 3367-3375.

PCT International Search Report and Written Opinion, PCT Application No. PCT/US2021/012905, Apr. 28, 2021, 11 pages.

Singhi, V. et al., "Smart Shopping System for Billing Automation", International Journal of Advances in Engineering Research (IJAER), vol. 13, Issue No. VI, Jun. 2017, pp. 20-33.

United States Office Action, U.S. Appl. No. 15/956,159, Feb. 7, 2020, 21 pages.

United States Office Action, U.S. Appl. No. 15/956,159, Jun. 22, 2020, 23 pages.

United States Office Action, U.S. Appl. No. 16/740,133, Jan. 30, 2023, 32 pages.

United States Office Action, U.S. Appl. No. 16/740,133, Sep. 21, 2022, 34 pages.

United States Office Action, U.S. Appl. No. 17/129,437, Apr. 26, 2023, 23 pages.

Chaki, J et al. "A Beginner's Guide to Image Preprocessing Techniques," Dec. 31, 2019, pp. 90-94.

European Patent Office, Office Action, EP Patent Application No. 21703127.7, Aug. 12, 2024, eight pages.

\* cited by examiner

100

Self-checkout Vehicle 102

Processor 104

Barcode Scanner 106

Image Recognition Sensor 108

Weight Sensor 110

Locking Device 112

Other Sensors and Components 114

Memory 116

118a

Network 120

118b

122

124

126a

126b

126c

102

212

202

214

210

204

206

208

216

SELF-CHECKOUT ANTI-THEFT VEHICLE SYSTEMS AND METHODS

CROSS REFERENCE TO RELATED APPLICATION

This application is a continuation of U.S. patent application Ser. No. 17/129,437, filed Dec. 21, 2020, which is a continuation of U.S. patent application Ser. No. 15/956,159, filed Apr. 18, 2018, which claims the benefit of U.S. Provisional Patent Application No. 62/537,140, filed Jul. 26, 2017, the contents of which are incorporated by reference herein in their entireties.

TECHNICAL FIELD

The present disclosure relates generally to self-checkout anti-theft systems and methods, and more specifically, to network connections, sensor fusion and the mechanical structure of a self-checkout vehicle.

BACKGROUND

Currently, an increasing number of convenience stores, grocery markets and retail outlets utilize self-checkout kiosks to allow customers to self-service their checkout. The benefit of self-checkout is apparent: grocers are able to save cashier labor while helping to reduce customer wait time by opening additional cash wrap. Despite its benefits, shoppers often encounter technical difficulties, require staff assistance and still line up at self-checkout registers at busy times.

In order to provide a better shopping environment for customers in physical stores, a seamless self-checkout format is needed. Since customers conventionally use a shopping cart or a shopping basket during their store visit, it is more desirable if customers can directly purchase and bag their purchased goods in their shopping vehicles and directly walk out of the store thereafter. In the meantime, necessary anti-theft measures need to be implemented in such self-checkout vehicles to ensure the interests of the grocers are protected.

BRIEF SUMMARY OF THE INVENTION

The self-checkout anti-theft systems and methods disclosed herein provide a holistic checkout experience that also prevents theft. In one aspect, the disclosed system contemplates, among other features, a centralized computing device that communicates with all the sensors and mechanical structures in the self-checkout vehicle and acts as the command center. The centralized computing device may be connected to an in-store and/or external network through wireless connection devices, including but not limited to Wi-fi, Bluetooth, Zigbee and the like. The external network connection may allow the centralized computing device to, including but not limited to: I) send or receive timely information updates relating to inventory, coupon, promotions, stock availability and the like; 2) verify payment status of merchandise in the cart; 3) payment processing; 4) identify item information based on image processing; and 5) send or receive customer information and receipts. The centralized computing device may also communicate with internal sensors or mechanical devices through wired connections or wireless connection devices via an internal network such as Wi-Fi, Bluetooth, Zigbee and the like. The internal network connection may allow the centralized computing device to, including but not limited to: 1) send or receive data from sensors for further processing; 2) communicate between the sensors to triangulate merchandise information; 3) update status of vehicle components; and 4) send or receive mechanical commands to trigger a specific action in the self-checkout vehicle.

In accordance with aspects of the present application, a self-checkout anti-theft vehicle system is disclosed. The system comprises: a self-checkout vehicle having a plurality of sensors and components implemented thereon, the self-checkout vehicle being used by shoppers for storing selected merchandises in a retail environment; and a centralized computing device. The centralized computing device is configured to: obtain information related to each merchandise selected and placed into the self-checkout vehicle by a shopper by exchanging data with the plurality of sensors and components via a first communication network, identify each merchandise via a second, different communication network based at least upon the information obtained from the plurality of sensors and components, and process payment information of each merchandise.

BRIEF DESCRIPTION OF THE FIGURES

For a more complete understanding of the example aspects, references are made to the following descriptions taken in connection with the accompanying drawings in which.

Figure 1:
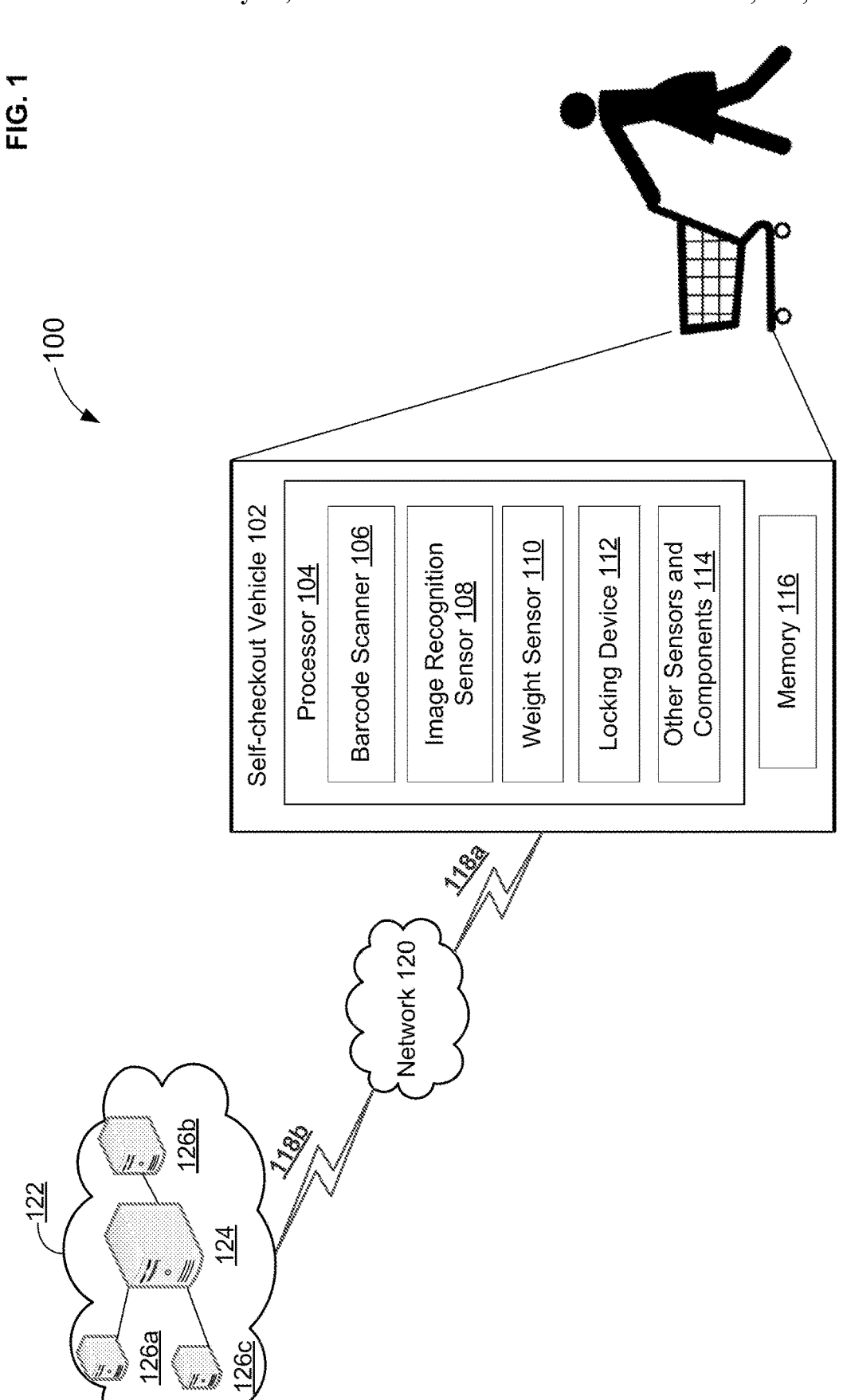
FIG. 1 illustrates a self-checkout anti-theft system, in accordance with aspects of the present disclosure.

The drawings referred to in this description are not to be understood as being drawn to scale except if specifically noted, and such drawings are only exemplary in nature.

DETAILED DESCRIPTION

Among other features, disclosed herein is a self-checkout anti-theft system. Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects of the disclosure.

FIG. 1 shows a self-checkout anti-theft system 100, in accordance with aspects of the present disclosure. System 100 may comprise a self-checkout vehicle 102 that may be used by a shopper in a retail environment (e.g., a department store, a supermarket) for storing and identifying at least one selected merchandise, and facilitating a transaction of the selected merchandise without requiring the shopper to go to a traditional check-out counter, station, or location for payment. The term "vehicle" may refer to any portable or movable physical structure supplied by a retailer for use by its customers inside the retail environment, such as a wheeled shopping cart in various sizes, a hand-held shopping basket, or a wheelchair/motorized vehicle integrated with a shopping receptacle for use by handicapped or disabled shoppers.

The self-checkout vehicle 102 may comprise at least one hardware processor 104 configured to execute and control a plurality of sensors and components implemented thereon for collecting and processing information related to each merchandise selected and placed into the self-checkout vehicle 102 by a shopper. In an aspect, the plurality of sensors and components may comprise a barcode scanner 106, an image recognition sensor 108, a weight sensor 110, a locking device 112, and other sensors and components 114. Via various I/O components (not show 11), the processor 104 may be coupled to memory 116 which includes computer storage media in the form of volatile and/or nonvolatile memory for executing machine executable instructions stored thereon. The memory 116 may be removable, non-removable, or a combination thereof.

As also shown m FIG. 1, the self-checkout vehicle 102 may communicate with a centralized computing device 124 via a first communication network 120 that is configured to, e.g., transmit and receive data to and from the plurality of sensors and components of the self-checkout vehicle 102 for further processing, communicate between these sensors and components to triangulate merchandise information, update a status of each sensor and component, and transmit and receive mechanical commands to trigger a specific action in the self-checkout vehicle 102. The aforementioned plurality of sensor and components can extract necessary merchandise-based information, such as location, weight and partial barcode capture in order to reduce the search parameters of e.g., an image recognition neural network 400 which will be described fully below in relation to FIG. 4.

It is to be appreciated that the self-checkout anti-theft system 100 may include any suitable and/or necessary interface components (not shown), which provide various adapters, connectors, channels, communication paths, to facilitate exchanging signals and data between various hardware and software components of the self-checkout vehicle 102, the centralized computing device 124, and any applications, peer devices, remote or local server systems/service providers, additional database system(s), and/or with one another that are available on or connected via the underlying network 120 and associated communication channels and protocols 118a, 118b (e.g., Internet wireless, LAN, cellular, Wi-Fi, WAN).

Moreover, the centralized computing device 124 may be deployed in a second, different communication network 122 to communicate with a plurality of computing devices associated with, for example, a retailer inventory and point of sale (POS) system or any third-party database/system/server 126a-c, such that the centralized computing device 124 may be configured to transmit or receive timely information updates relating to a retailer's inventory, coupon, promotions, stock availability and the like, verify payment status of merchandise in the self-checkout vehicle 102, payment processing, and identify merchandise information based at least on, e.g., image processing, and send or receive customer information and receipts.

Figure 2:
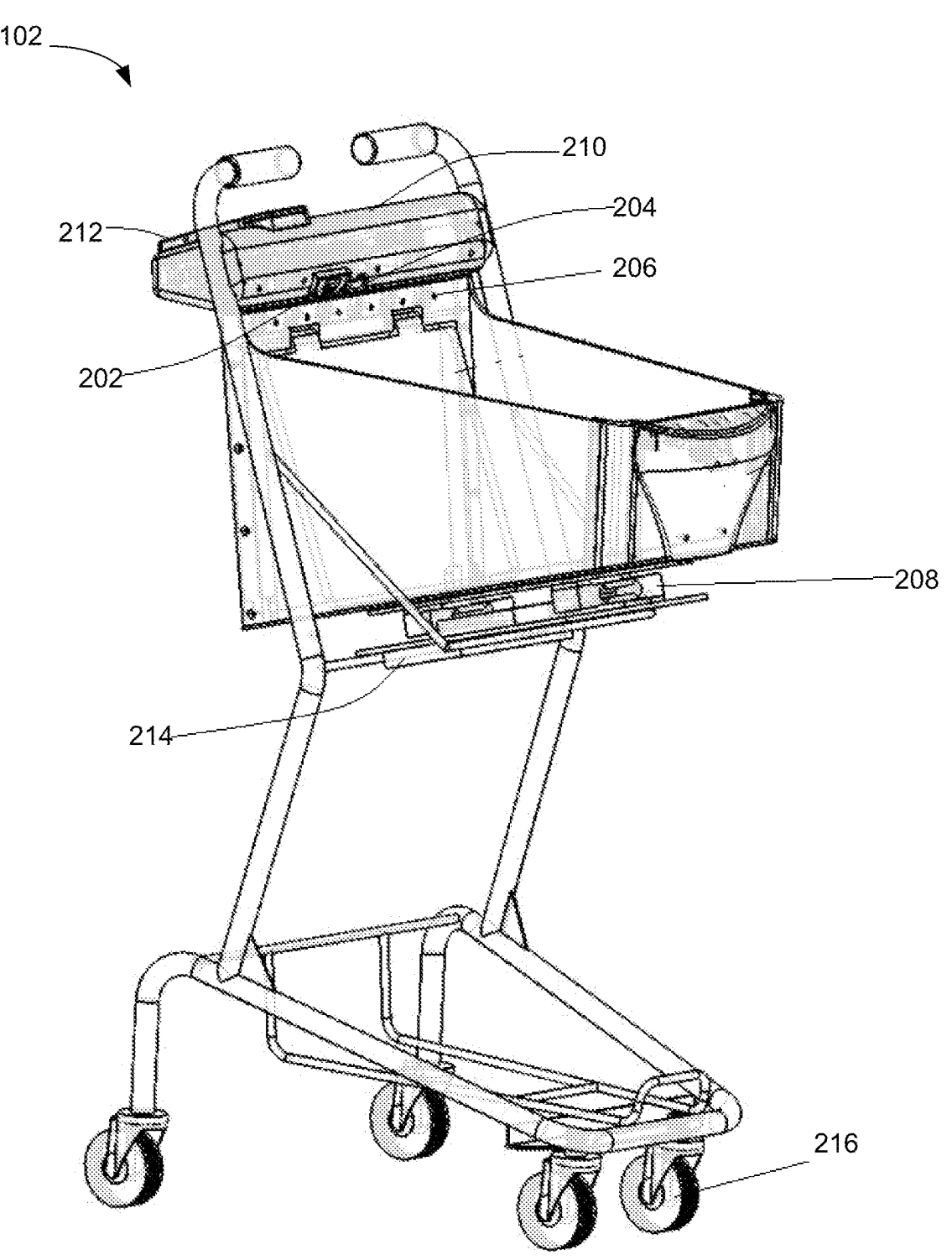
FIG. 2 illustrates a perspective view of a self-checkout vehicle, in accordance with an example aspect of the present disclosure.

More specifically, referring to FIG. 2, a barcode scanner 202 (i.e., barcode scanner 106) of the self-checkout vehicle 102 of FIG. 1 may be implemented to identify any merchandise selected and placed into the self-checkout vehicle 102 by a shopper, according to aspects of the present application. Generally, each merchandise in a retail store may be associated with at least one unique merchandise ID code. Examples of merchandise ID code may include, but are not limited to a, bar code, universal product code (UPC), quick response (QR) code, numeric code, alphanumeric code, or any other two-dimensional (2D) image code or three-dimensional (3D) image code. The barcode scanner 202 may accordingly include any suitable type of circuitry for reading the unique merchandise ID code. Examples of barcode scanner may comprise a pen-type scanner, a laser scanner, a charge-coupled device (CCD) scanner, a camera-based scanner, a video camera reader, a large field-of-view reader, or an omnidirectional barcode scanner. In one aspect, the barcode scanner 202 may be disposed or positioned on a selected area of the self-checkout vehicle 102, as shown in FIG. 2. Alternatively, the barcode scanner 202 may be implemented as a stand-alone cordless and/or wireless electronic device that may be detachably mounted on a specific self-checkout vehicle 102 during use. Moreover, the barcode scanner 202 may be body mounted on the shopper (e.g., a wrist band) to leave her bands free to handle objects or goods being scanned or dealing with other tasks or for any other reason or need.

According to an aspect of the present application, the barcode scanner 202 may be configured to collect information relating to the selected merchandise based on the merchandise ID code which may include a machine-readable code in the form of numbers and a pattern of parallel lines of varying widths, printed on and identifying specific merchandise. For example, a linear or I-dimensional (1D) barcode may include two parts: a barcode and a 12-digit UPC number. The first six numbers of the barcode may be a manufacturer's identification number. The next five digits may represent the merchandise's number. The last number may be a check digit which may enable the barcode scanner 202 to determine if the barcode has been scanned correctly. A linear barcode typically holds any type of text information up to 85 characters. In contrast, a 2D barcode is more complex (can store over 7,000 characters) and may include more information in the code such as price, quantity, web address, expiration dates, or image. Furthermore, engraved or applied to merchandise itself as a part of the manufacturing process, a 3D barcode may include bars and/or squares that are protrusive and can be felt when touched. The time it takes the laser of the barcode scanner 202 to be reflected back and be recorded may determine the height of each bar/square as a function of distance and time, such that the character represented by the 3D code maybe interpreted. 3D barcodes may be a solution for rectifying various problems, such as inaccurate pricing, inventory errors, and overstocking, as it is difficult, if not entirely impossible, to alter or obstruct the 3D barcode's information.

When using a 2D barcode, for example, the barcode scanner 202 may read the symbols of the merchandise TD code and convert or decode them into information such as the merchandise's origin, price, type, location, expiration date, etc. In one aspect, processing circuitry in or associated with the barcode scanner 202 may be configured to provide a raw signal proportional to signal intensities detected while scanning the merchandise ID code with limited or no decoding performed within the scanner 202. Rather, the raw signal may be transmitted to the centralized computing device 124 via the first communication network 120 for identifying the merchandise, thereby achieving a more compact design and implementation of the barcode scanner 202.

Accordingly, the centralized computing device 124 may be configured to process the obtained information regarding the merchandise received from the barcode scanner 202 based at least on the merchandise 1D code, correlate such information with at least data stored in various database/system/server 126*a-c* in order to, e.g., identify the merchandise, update a retailer's inventory and stock availability information associated with database/system/server I 26*a-c*, determine appropriate coupons and promotions for distributing to the shopper, and facilitate payment processing if the merchandise is checked out by the shopper.

In accordance with another aspect of the present application, the barcode scanner 202, in conjunction with image recognition sensors 108, may be used to facilitate deep learning image labeling data collection process. For example, when a shopper decides to purchase an item, he/she may scan the merchandise ID code and then proceed to putting the item into the self-checkout vehicle 102. During the process of putting the merchandise into the self-checkout vehicle 102, image recognition sensors 108 may be consistently collecting image data of the merchandise. As the shopper already used the barcode scanner 202 to scan the merchandise ID, the centralized computing device 124 may be configured to identify the product and automatically label the associated images collected from the image recognition sensors 108 with that specific merchandise ID. The labeled image data may be then leveraged for training, e.g., the neutral network 400 of FIG. 4 for eventual scan-less identification applications.

Figure 3:
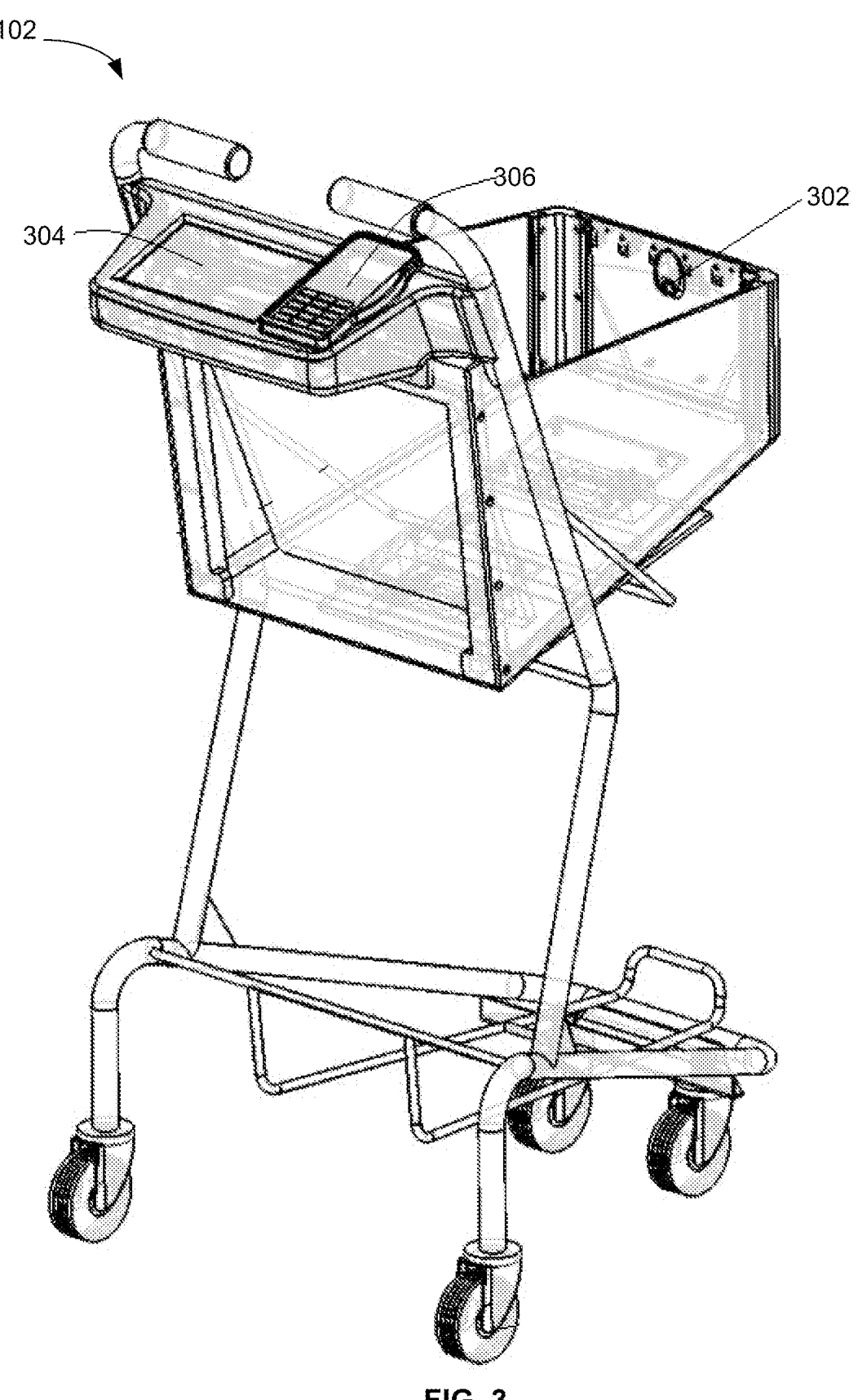
FIG. 3 illustrates another perspective view of a self-checkout vehicle, in accordance with an example aspect of the present disclosure.
Figure 4:
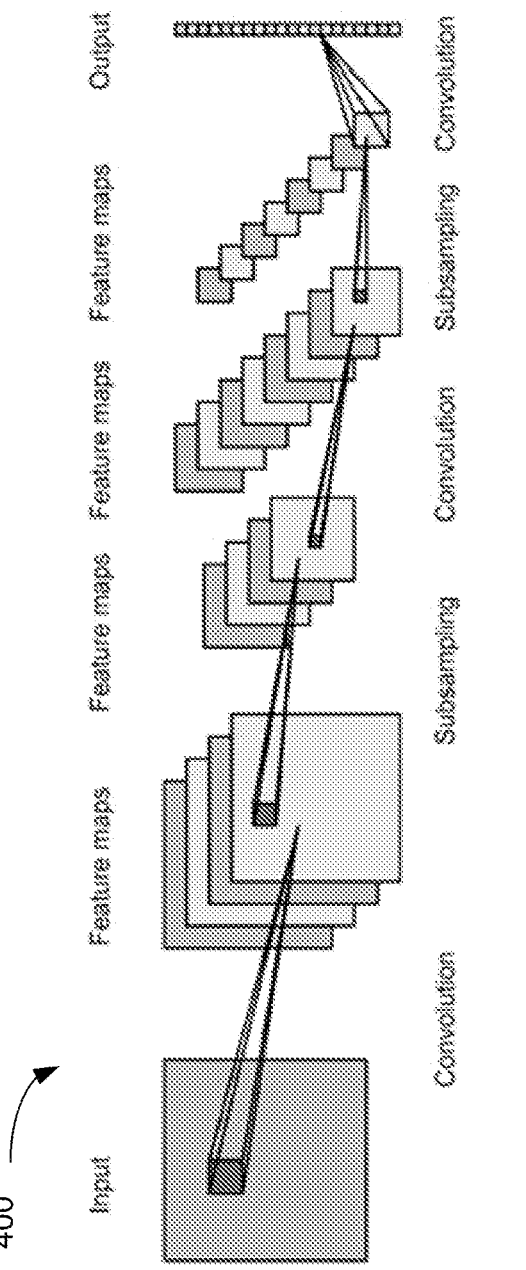
FIG. 4 illustrates a deep learning neural network of a self-checkout anti-theft system, in accordance with an example aspect of the present disclosure.

According to yet another aspect of the present application, referring back to FIG. 1, the image recognition sensor 108 may be configured to: collect one or more images of the merchandise after the merchandise has been placed inside the self-checkout vehicle 102, and transmit the images to the centralized computing device 124 via the first communication network 120 for determining whether the shopper has placed the correct item after scanning the merchandise with the barcode scanner 106. Specifically, the centralized computing device 124 may utilize the computation resources of the associated database/system/server 126*a-c* to contemplate a deep learning system for training various neural network models based at least on merchandise images received from the self-checkout vehicle 102 for object detection and recognition purposes. For example, as shown in FIGS. 2 and 3, data such as images and video data obtained from cameras 204 and/or 302 of the self-checkout vehicle 102 may be used by the centralized computing device 124 and associated database/system/server 126*a-c* to form a distributed neural network 400 of FIG. 4, for real-time data analysis including segmentation, object detection, tracking, recognition, or the like. Such distributed neural network may be scalable to exchange data with additional devices/sensors and any other suitable neural network such as a convolutional neural network (CNN), a deep neural network (DNN), recurrent convolutional neural network (RCNN). As shown in FIG. 4, the network 400 may include an input layer on an input end, a sequence of interleave convolutional layers and subsampling layers, and a fully connected layer at an output end. When a merchandise is added into the self-checkout vehicle 102, circuitry of the input layer module of the network 400 may be triggered to obtain still image data, video frame data, or any available data of the merchandise captured and transmitted by the cameras 204 and/or 302. In one aspect, normalized image data in the red-green-blue color space may serve as inputs to the network 400. The input data may comprise a variety of different parameters of each merchandise including but not limited to the shape, size, colors, and text information printed on each merchandise. The network 400 may be configured to extract merchandise features based on the input data, perform object detection and tracking of each merchandise, and correlate with various merchandise specific information stored in at least one of the associated database/system/server 126*a-c* (e.g., a retailer's inventory database).

More specifically, a convolutional layer may receive data from the input layer in order to generate feature maps. For example, an input to a convolutional layer may include a ni×m×r image where m is the height and width of the image (measured in pixel) and r is the number of channels, e.g., an RGB image has r=3. The convolutional layer may have k filters (or kernels) of size n×n×q where n is smaller than the dimension of the image and q may either be the same as the number of channels r or smaller and may vary for each kernel. The size of each filter gives rise to locally connected structures which are each convolved with the image to produce k feature maps of size m−n+1. Each map is then subsampled by a subsampling layer typically with mean or max pooling over p×p contiguous regions where p may range between 2 for small images and usually not more than 5 for larger inputs. For example, max-pooling may provide for non-linear down-sampling of feature maps to generate subsampled feature maps. In an aspect, a subsampling layer may apply max-pooling by portioning feature maps into a set of non-overlapping portions and providing a maximum value for each portion of the set of non-overlapping portions. Either before or after a subsequent subsampling layer, an additive bias and sigmoidal nonlinearity may be applied to each feature map. For example, units of the same color may have been assigned the same weights. Any number of convolutional layers and subsampling layers may be added into the network 400 for generating and providing subsampled features maps to the fully connected layer. The fully connected layer may use, e.g., a soft-max activation function to use the features maps output from preceding convolutional layer or subsampling layer to classify the original input image into various classes based on training dataset stored on one of the associated database/system/server 126*a-c*. For example, possible outputs from the fully connected layer may indicate at least one of: a value representing the volume of a product; a value about at least one outer dimension of a product; a value representative of the geometrical shape of a product; a value representative of geometrical relations of a product, such as a relation between at least two of width, height and length; a set of at least two values related to colors of a product; a set of values related to the area which at least one specific color takes up in a product including the percentage that areas with a certain color take up with respect to at least one side of the outer surface of the product; data related to the color taking up the biggest fraction, optionally the second biggest fraction, etc. of at least one side of the outer surface of the product. Thereafter, the neural network 400 may perform object detection based at least on the outputs from the fully connected layer and the merchandise specific information stored in at least one of the associated database/system/server 126*a-c* (e.g., a retailer's inventory database) to determine whether the shopper has placed the correct item after scanning the merchandise with the barcode scanner 202.

Alternatively, according to another aspect of the present application, referring back to FIG. 1, the image recognition sensor 108 of the self-checkout vehicle 102 may be configured to: collect one or more images of a merchandise after the merchandise has been placed inside the self-checkout vehicle 102 or upon detecting that the merchandise is being placed into the self-checkout vehicle 102, and transmit the images to the centralized computing device 124 via the communication network 120. That is, without requiring the shopper to scan each merchandise, other sensors and components 114 of the self-checkout vehicle 102 may comprise one or more motion sensors configured to monitor and track movements relating to merchandise placement into or removal from itself (e.g., via triangulation), and capture and transmit merchandise images to the centralized computing device 124 for object detection and recognition. For example, the centralized computing device 124 may implement the neural network 400 of FIG. 4 to extract various features of each merchandise image via a plurality of interleaved convolutional layers and sub-sampling layers and identify each merchandise based on the extracted features, via, e.g., the fully connected layer. In one aspect, at least a portion of the neural network 400 may be configured to form a scalable end-to-end distributed neural network framework that may be used in various different contexts such as shopper facial recognition and/or voice recognition, or other cloud-based deep learning systems for retailor inventory management or shopping behavior analysis.

It should be appreciated that, in addition to the deep learning-based object detection and recognition techniques described above, the self-checkout anti-theft system 100 of FIG. 1 may contemplate, for example, rigid or deformable template matching based methods, knowledge-based methods, object-based image analysis methods, or any other suitable methods. In one aspect, template matching based methods generally include generating and storing a template for each to-be-detected object class (e.g., each merchandise in a store) by hand-crafting or learning from specific training set, and comparing an object image and the stored templates at a number of defined positions to measure similarity and locate the best matches via allowable translation, rotation, and scale changes. The most popular similarity measures may include the sum of absolute differences (SAD), the sum of squared differences (SSD), the normalized cross correlation (NCC), and the Euclidean distance (ED).

Further, knowledge-based object detection methods may focus on encoding specific shape or geometric information of a merchandise and spatial constraints or relationships between the merchandise and its background (specific location inside a store) to establish prior knowledge and detection rules for various hypotheses. Subsequently, an input image may be compared against the hypotheses via at least a set of selected search parameters within the neural network 400 thereby significantly reducing object recognition time. For example, instead of searching all of the available merchandise images associated with a store upon receiving at least one input image of a merchandise from the image recognition sensor 108 of the self-checkout vehicle 102, the centralized computing device 124 may also simultaneously receive the location data of the self-checkout vehicle 102 within the store (e.g., a specific side of an aisle of the store, or the counter location of a deli department of the store). Such location data may be determined by the other sensors and components 114 of the self-checkout vehicle 102 via a global positioning system (GPS) transceiver or any suitable locator apparatus. That is, the self-checkout vehicle 102 may be equipped with a GPS or similar device to pinpoint the exact location of the self-checkout vehicle 102 within the store, or calculate a triangulated position based on how quickly the other sensors and components 114 respond to different signals broadcast by different base stations deployed within the store. Based at least upon the received location data of the self-checkout vehicle 102 and store merchandise layout information, the centralized computing device 124 may be configured to search a portion of all available merchandise images stored in the neural network 400, focusing on merchandise satisfying a limited set of parameters. Thereafter, to further narrow down the search results and resolve ambiguity, the centralized computing device 124 may be configured to rely on other available merchandise information (e.g., the weight of the merchandise measured by the weight sensor 110) to perform one or more searches within results returned by a pervious search effort to finally identify the objection placed in the self-checkout vehicle 102.

To improve search speed and accuracy, in one aspect, the centralized computing device 124 may be configured to simultaneously perform multiple above-noted object recognition operations with different search parameters within different datasets of the neural network 400. For example, for misplaced store items that have been chosen and placed in the self-checkout vehicle 102 by a customer, a search based on the detected location and weight of the merchandise may be supplemented by one or more sequential or concurrent searches based on different search parameters (e.g., a combination of detected unique merchandise ID code and weight of the merchandise). Such additional searches may be triggered in response to detecting a selected threshold value for an on-going search has been exceeded. For example, in response to detecting that 60% of an initial search of an input merchandise image against a portion of merchandise images saved in the neural network 400 based on location and weight information of the merchandise yields less than 5 hits, the centralized computing device 124 may be configured to initiate at least one additional search based on a different combination of search parameters (e.g., a specific customer's shopping history and the unique merchandise ID code of the merchandise). For another example, concurrent or sequential additional searches may be performed within labeled image data of merchandise that are included in in-store promotions and collected from multiple shoppers during a selected period of time (e.g., past three days).

Moreover, an object-based image analysis method may first segment an image into a number of homogenous regions representing a relatively homogeneous group of pixels by selecting desired shape, scale, and compactness criteria. For example, the shape parameter may define to which percentage the homogeneity of shape is weighted against the homogeneity of spectral values. The compactness parameter may include a sub-parameter of shape and is used to optimize image objects with regard to compactness or smoothness. The scale parameter may be used for controlling the internal heterogeneity of the resulting objects and is therefore correlated with their average size, i.e., a larger value of the scale allows a higher internal heterogeneity, which increases the number of pixels per object and vice versa. Once segments are generated, one may extract object features, such as spectral information as well as size, shape, texture, geometry, and contextual semantic features. These features are then selected and fed to a classifier (e.g., membership function classifier, nearest neighbor classifier, decision tree, neural network of FIG. 4) for classification.

It should be appreciated that the image recognition neural network 400 may have two form-factors: computing performed directly on the self-checkout vehicle 102 via a graphics process unit (GPU) together with a central processing unit (collectively represented by the processor 104 in FIG. 1); and computing performed in a local server (e.g., the centralized computing device 124 of FIG. 1) which may be configured to exchange information with the processor unit 104 of the self-checkout vehicle 102 via the first communication network 120.

As shown in FIG. 2, the self-checkout vehicle 102 may also use at least one light curtain or infrared/laser sensor 206 to distinguish between a shopper's hand and an object, and contemptuously trigger at least one camera 204 or 302 to start collecting images of each merchandise which is moving with respect to a selected reference position of the self-checkout vehicle 102 (e.g., the upper rim of the vehicle), thereby indicating an addition of merchandise to the self-checkout vehicle 102. Moreover, at least one miniature radar (not shown) may be installed on the self-checkout vehicle 102 to determine shape information related to each merchandise, detect movements of each merchandise with respect to the self-checkout vehicle 102, and transmit the captured information to the centralized computing device 124 via the communication network 120. In one aspect, a plurality of weight sensors 208 may be additionally installed on the bottom of the self-checkout vehicle 102 to continuously monitor the content change of the self-checkout vehicle 102. Alternatively, a matrix of pressure sensors mounted to a plate may be used to cover the bottom of the self-checkout vehicle 102. As such, by checking signals of pressure sensors of the plate, weight information of each added merchandise may be derived.

As one or more merchandises being added to the self-checkout vehicle 102 at respective locations inside a retail store, a touch screen 210 or 304 on the vehicle 102 may be used to indicate to the shopper, e.g., a list showing the name, price and quantity of the content. In one aspect, if the centralized computing device 124 has stored thereon information regarding an individual's past shopping records or habits, information may be transmitted by the centralized computing device 124 to be displayed on the touch screen 210 or 304 to show a previously bought product may be currently on sale, or that there is a specific offer about the product. Other information such as store layout map, promotions, or various marketing materials may be selected and displayed. Further, if a merchandise is no longer needed and permanently removed from the self-checkout vehicle 102, the shopper may use the touch screen 210 or 304 to delete the merchandise from the list. As described previously, the centralized computing device 124 is configured to continuously monitor the plurality of sensors and components of the self-checkout vehicle 102. Any change detected by the sensors/components with respect to the content of the self-checkout vehicle 102 will be transmitted to the centralized computing device 124, and relevant information stored in the network 122 will be updated by the centralized computing device 124 accordingly.

In one aspect, to spare the efforts of reloading selected merchandises into one or more shopping bags at the checkout, the self-checkout vehicle 102 may have at least one shopping bag attached to a locking device (not shown). Such locking device may be controlled by the centralized computing device 124 to not only keep the attached shopping bag maximally stretched at all times and ensure that the shopping bag does not crumble or fold thereby allowing a maximum viewing angle for the cameras 204 or 302, but also prevent the shopper from taking out any merchandise out of the self-checkout vehicle 102 without payment. The locking device may be made of solenoid, electronic switch or any mechanical device which allows physical lock and unlock.

Moreover, the shopper may use the touch screen 210 or 304 to initiate a final review of all the selected merchandise in the self-checkout vehicle 102, and indicate her preferred payment methods (e.g., credit card, internet payment accounts). The centralized computing device 124 then communicates with appropriate databases 126a-c to facilitate the transaction based on the selected shopper's payment method. For example, a credit card reader 212 or 306 may be installed on the self-checkout vehicle 102, and the touch screen 210 or 304 may be configured to display shopper authentication information and credit card transaction information. Specifically, when the shopper slides or inserts a credit card through a slot, the credit card reader 212 or 306 may obtain information stored on the card (e.g., account number, account holder's name, expiration date, etc.) and encrypt this information for payment processing at the centralized computing device 124. Upon successful payment, the centralized computing device 124 may prepare a purchase receipt that may be transmitted to the shopper's mobile device(s) or printable at the store. In addition, the shopping bag attached to the self-checkout vehicle 102 may be released from the locking device, such that the shopper is allowed to carry the shopping bag within or out of the retail store without triggering other anti-theft sensors. Moreover, the centralized computing device 124 may reset all the sensors and components of the self-checkout vehicle 102 after a completed transaction.

As also shown in FIG. 2, a battery 214 may be installed on the self-checkout vehicle 102 for powering various circuitry and components. The battery may be located at the base as shown, or at the handle of the vehicle 102, or elsewhere on the vehicle 102. Alternatively or additionally, power may be generated by a charging system, for example, a voltage generator which produces power from motion of the self-checkout vehicle 102. The charging system may charge the battery 214, which in turn powers other circuitry and components of the vehicle 102. Further, one or more speed sensors 216 may be installed on the vehicle 102 for detecting any vehicle movement. For example, when the vehicle 102 is moving, the data obtained from the weight sensor 208 may not be accurate. As such, when the speed sensors 216 detect that the vehicle 102 is moving, the processor 104 of the vehicle 102 may temporarily disable part of the vehicle functions, such as forbidding adding in new items in order to help adjust weight measurement by the weight sensor 208. Alternatively, as one or more merchandises are being added, the speed sensors 216 will detect the self-checkout vehicle movement and inclination to normalize the data collected by the weight sensor 208. As the self-checkout vehicle 102 is being moved within its environment, the speed sensors 216 will detect changes in level and speed and will be used to ensure the proper indication of the product weight is displayed on the self checkout vehicle 102. Moreover, the speed sensors 216 will be used to detect changes in customer activity and movement to subsequently determine when to take a weight measurement of merchandise being added.

In accordance with yet another aspect of the present application, at least one pathway may be implemented in the retail store and configured to control and direct the self-checkout vehicle 102 to a check-out location via, e.g., the communication network 120. Further, a turnstile may be positioned at the check-out location, and controlled by the centralized computing device 124 to verify payment information of the merchandise as the shopper walks through the turnstile.

Figure 5:
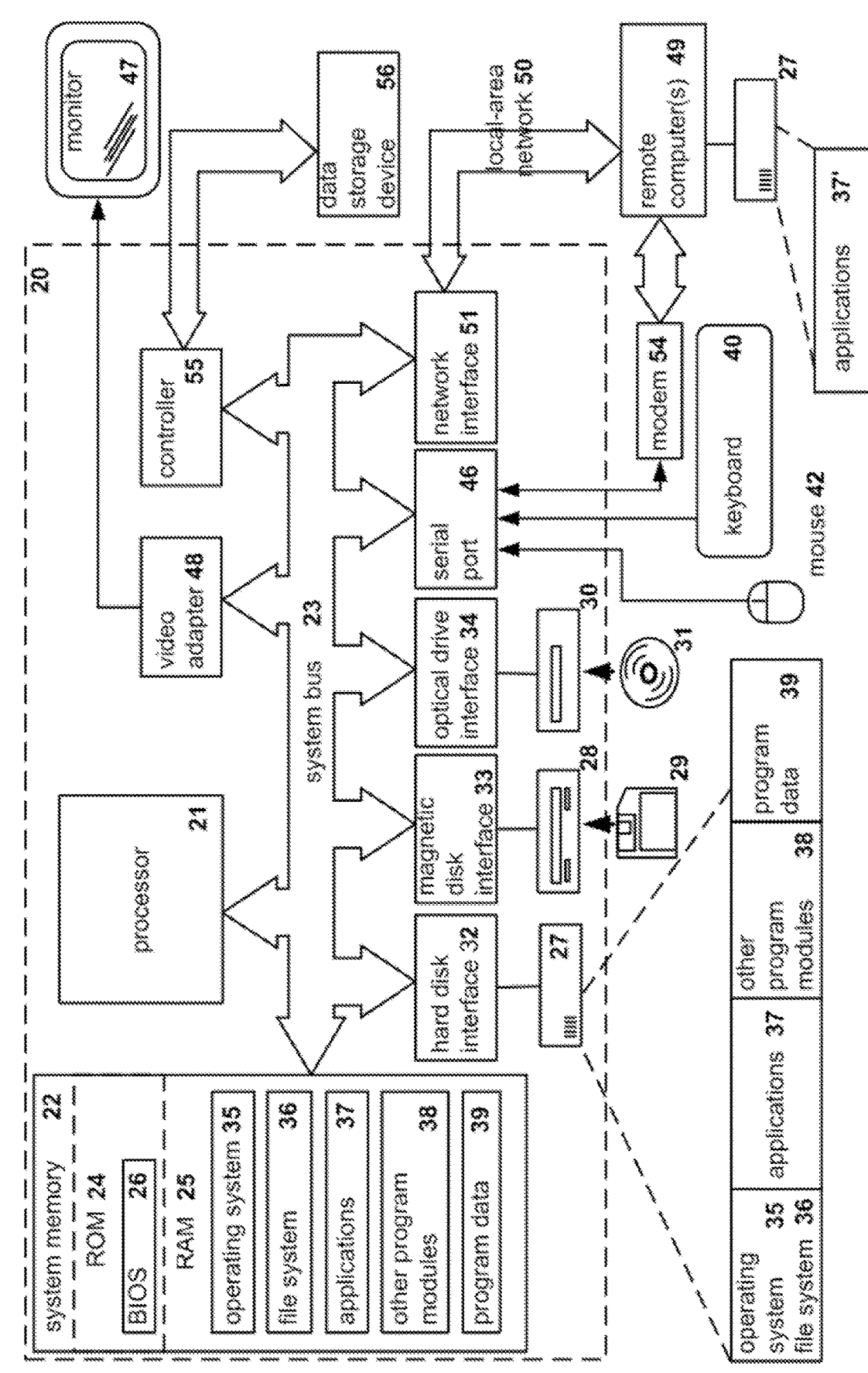
FIG. 5 illustrates an example computer system through which the disclosed aspects of the systems and methods may be implemented.

FIG. 5 illustrates an example computing system 20 (which may be a computer or a server) on which the disclosed systems and method can be implemented according to an example aspect. It should be appreciated that the detailed computer system 500 can correspond to the self-checkout vehicle 102 or the centralized computing device 124 provided to implement the algorithms described above.

As shown, the computing system 20 includes at least one processing unit 21 (e.g., a GPU, or a CPU, or a combination of both), a system memory 22 and a system bus 23 connecting the various system components, including the memory associated with the central processing unit 21. The central processing unit 21 and the central computing unit 600 can correspond to the processor 104 or the processor of the centralized computing device 124 (not shown) and the system memory 22 can correspond to memory 116 of FIG. 1, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the computing system 20, such as those at the time of loading the operating system with the use of the ROM 24.

The computing system 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computing system 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computing system 20 has a file system 36, where the recorded operating system 35 is kept, and also additional program applications 37, other program modules 38 and program data 39. The user is able to enter commands and information into the computing system 20 by using input devices (keyboard 40, mouse 42). Other input devices (not shown) can be used: microphone, scanner, and so on. Such input devices usually plug into the computing system 20 through a serial port 46, which in turn is connected to the system bus, but they can be connected in other ways for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computing system 20 is able to operate within a network environment, using a network connection to one or more remote computers 49. The remote computer (or computers) 49 are also computers or servers having the majority or all of the aforementioned elements in describing the nature of a computing system 20. Other devices can also be present in the computer network, such as routers, network stations, peer devices or other network nodes. According to one aspect the remove computer(s) 49 can correspond to the computer devices capable of managing transaction log 140, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the computing system 20 is connected to the local-area network 50 across a network adapter or network interface 51. When networks are used, the computing system 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general-purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclose that many more modifications than mentioned above are possible without departing from the inventive concepts disclosed herein.

What is claimed is:

1. A method comprising:

receiving, by a processor coupled to a self-checkout vehicle, an image captured by a camera coupled to the self-checkout vehicle, wherein the image depicts an item;

receiving, by the processor of the self-checkout vehicle, location data associated with the image of the item, the location data describing a location within a store where the image was captured and wherein the location data is captured by a location sensor coupled to the self-checkout vehicle;

identifying, by the processor of the self-checkout vehicle, a set of candidate items located near the location where the image was captured based on the location data captured by the location sensor coupled to the self-checkout vehicle, wherein the set of candidate items are identified by:

filtering a set of items at the store based on whether each item in the set of items is within a threshold distance of the location within the store where the image was captured;

calculating, by the processor of the self-checkout vehicle, a score for each of the set of candidate items based on the location data and the image, wherein the score for a candidate item represents a likelihood that the candidate item is depicted in the image, wherein calculating the score for a candidate item of the set of candidate items comprises:

generating a set of features describing the image, and applying a classifier to the set of features to compute the score;

identifying, by the processor of the self-checkout vehicle, the item depicted in the image based on the calculated scores of the set of candidate items; and updating a display of the self-checkout vehicle based on the identified item.

2. The method of claim 1, wherein the location data is received from a global positioning system device.

3. The method of claim 1, wherein the location where the image was captured is one of a side of an aisle of a store, or a counter location of a deli department of a store.

4. The method of claim 1, wherein receiving location data describing comprises:

receiving a set of signals from one or more sensors coupled to the self-checkout vehicle; and calculating a triangulated position of the self-checkout vehicle using the set of signals, wherein a portion of the set of signals is broadcasted by different base stations located within the store.

5. The method of claim 4, wherein the triangulated position of the self-checkout vehicle is calculated based on a speed at which the set of signals broadcasted by the different base stations are processed by the one or more sensors.

6. The method of claim 1, wherein identifying a set of candidate items located near the location of the self-checkout vehicle comprises:

identifying items within a threshold distance to the location where the image was captured.

7. The method of claim 1, wherein the set of candidate items are identified based on item layout information of the store.

8. The method of claim 1, wherein identifying the item in the image based on the calculated scores of the set of items comprises:

comparing the calculated scores of the set of items; and responsive to identifying an item with a highest score, determining the item with the highest score as the item that is depicted in the image.

9. The method of claim 1, further comprising:

receiving a weight measurement of an item from a weight sensor coupled to the self-checkout vehicle; and calculating a score for each of the set of items based on the weight measurement of the item and the location data associated with the image of the item.

10. The method of claim 1, further comprising:

receiving a user's shopping history; and calculating a score for each of the set of items based on the user's shopping history and the location data associated with the image of the item.

* * * * *